(12) United States Patent
Venkataraman et al.

(10) Patent No.: US 11,876,557 B1
(45) Date of Patent: Jan. 16, 2024

(54) SETTING PARAMETERS OF OPTICAL TRANSMITTER USING RECEIVE-SIDE CONTROL

(71) Applicant: Apple Inc., Cupertino, CA (US)

(72) Inventors: Harish Venkataraman, Half Moon Bay, CA (US); Cristiano L. Niclass, San Jose, CA (US); Susan A. Thompson, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 17/379,799

(22) Filed: Jul. 19, 2021

Related U.S. Application Data

(60) Provisional application No. 63/082,296, filed on Sep. 23, 2020.

(51) Int. Cl.
*H04B 10/079* (2013.01)
*H04L 1/00* (2006.01)

(52) U.S. Cl.
CPC ..... *H04B 10/07955* (2013.01); *H04L 1/0016* (2013.01)

(58) Field of Classification Search
CPC .. H04B 10/07955; H04B 10/40; H04B 10/50; H04B 10/60; H04B 10/43; H04B 10/508; H04L 1/0016; G01J 2001/4466; G01J 2001/442; G01S 7/4865; G01S 17/08; G01S 17/42; G01S 17/894; G01S 7/4863
See application file for complete search history.

(56) References Cited

U.S. PATENT DOCUMENTS

| | | | |
|---|---|---|---|
| 5,291,199 A * | 3/1994 | Overman | G01S 7/021 342/13 |
| 9,500,744 B2 | 11/2016 | Borosak | |
| 10,547,477 B2 | 1/2020 | Nguyen et al. | |
| 10,725,155 B2 | 7/2020 | Rieger et al. | |
| 10,727,643 B1 | 7/2020 | Williams et al. | |
| 10,845,480 B1 * | 11/2020 | Shah | G01S 17/10 |
| 2017/0317765 A1 * | 11/2017 | Morris | H04B 10/11 |
| 2018/0133507 A1 * | 5/2018 | Malchano | A61N 1/36025 |
| 2020/0256960 A1 * | 8/2020 | LaChapelle | G01S 7/4863 |

* cited by examiner

*Primary Examiner* — Hibret A Woldekidan
(74) *Attorney, Agent, or Firm* — Brownstein Hyatt Farber Schreck, LLP

(57) ABSTRACT

An electronic device includes an optical transmitter, an optical receiver, a memory, an optical transmitter controller, and an optical receiver controller. The memory is configured to store an indicator of a next pulse repetition interval (PRI) and a set of parameters associated with operating the optical transmitter in accordance with the next PRI. The optical transmitter controller is configured to retrieve the indicator of the next PRI in response to a trigger signal; retrieve, using the indicator of the next PRI, the set of parameters; and operate the optical transmitter in accordance with the set of parameters. The optical receiver controller is configured to operate the optical receiver; update the indicator of the next PRI stored in the memory; and provide the trigger signal to the optical transmitter controller.

21 Claims, 10 Drawing Sheets

SETTING PARAMETERS OF OPTICAL TRANSMITTER USING RECEIVE-SIDE CONTROL

CROSS-REFERENCE TO RELATED APPLICATION

This application is a nonprovisional of and claims the benefit under 35 U.S.C. § 119(e) of U.S. Patent Application No. 63/082,296, filed Sep. 23, 2020, the contents of which are incorporated herein by reference as if fully disclosed herein.

FIELD

The described embodiments generally relate to optical sensor systems. More particularly, the described embodiments relate to ensuring that an optical sensor system complies with predefined performance specifications.

BACKGROUND

Existing and emerging consumer applications have created an increasing demand for real-time depth sensors and 3D image sensors (the latter of which are commonly known as light detection and ranging (LIDAR) sensors). Such sensors may in some cases be implemented using single-photon avalanche diode (SPAD)-based photon detectors. Such sensors may also be implemented using a set of one or more optical transmitters (e.g., one or more lasers or light-emitting diodes (LEDs)) that emit optical pulses including visible or invisible light, which optical pulses may be returned (e.g., reflected or scattered) toward an optical receiver (e.g., a SPAD).

When operating an optical sensor system that includes an optical transmitter, care may need to be taken to monitor compliance of the optical transmitter with a set of predefined performance specifications. For example, care may need to be taken to ensure that an average operating current of the optical transmitter is not exceeded.

SUMMARY

Embodiments of the systems, devices, methods, and apparatus described in the present disclosure are directed to operating an optical sensor system and/or ensuring that an optical sensor system complies with predefined performance specifications. In some embodiments, parameters of an optical transmitter may be set using receive-side control. For example, an optical receiver controller may provide one or more parameters for operating an optical transmitter to an optical transmitter controller. The optical receiver controller may also indicate when the parameter(s) should be retrieved or used by the optical transmitter controller. The provided parameter(s) may enable the optical transmitter controller to retrieve additional parameters for operating the optical transmitter.

In a first aspect, the present disclosure describes an electronic device. The electronic device may include an optical transmitter, an optical receiver, a memory, an optical transmitter controller, and an optical receiver controller. The memory may be configured to store an indicator of a next pulse repetition interval (PRI) and a set of parameters associated with operating the optical transmitter in accordance with the next PRI. The optical transmitter controller may be configured to retrieve the indicator of the next PRI in response to a trigger signal; retrieve, using the indicator of the next PRI, the set of parameters; and operate the optical transmitter in accordance with the set of parameters. The optical receiver controller may be configured to operate the optical receiver; update the indicator of the next PRI stored in the memory; and provide the trigger signal to the optical transmitter controller.

In a second aspect, a depth sensor is described. The depth sensor may include an optical transmitter, an optical transmitter controller, an optical receiver, and an optical receiver controller. The optical transmitter controller may be configured to operate the optical transmitter in accordance with a PRI selected from a set of multiple PRIs having different parameters. The optical receiver controller may be configured to operate the optical receiver and provide, to the optical transmitter controller, a first indication of the PRI and a second indication of when to use the PRI.

In a third aspect, an optical sensor system is described. The optical sensor system may include a set of one or more optical transmitters, a set of optical receivers, an optical transmitter controller, and an optical receiver controller. The set of optical receivers may be distributed between a set of optical sensing banks. Each optical sensing bank in the set of optical sensing banks may include a respective different subset of optical receivers in the set of optical receivers. The optical transmitter controller may be configured to enable, at any given time, at least one optical transmitter in the set of one or more optical transmitters. The at least one optical transmitter may be associated with an optical sensing bank in the set of optical sensing banks. The optical transmitter controller may also be configured to operate the enabled at least one optical transmitter in accordance with a next PRI. The optical receiver controller may be configured to enable, at any given time, a subset of optical receivers associated with the optical sensing bank; and provide to the optical transmitter controller a first set of indications of the next PRI and a second set of indications of when to use each next PRI.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
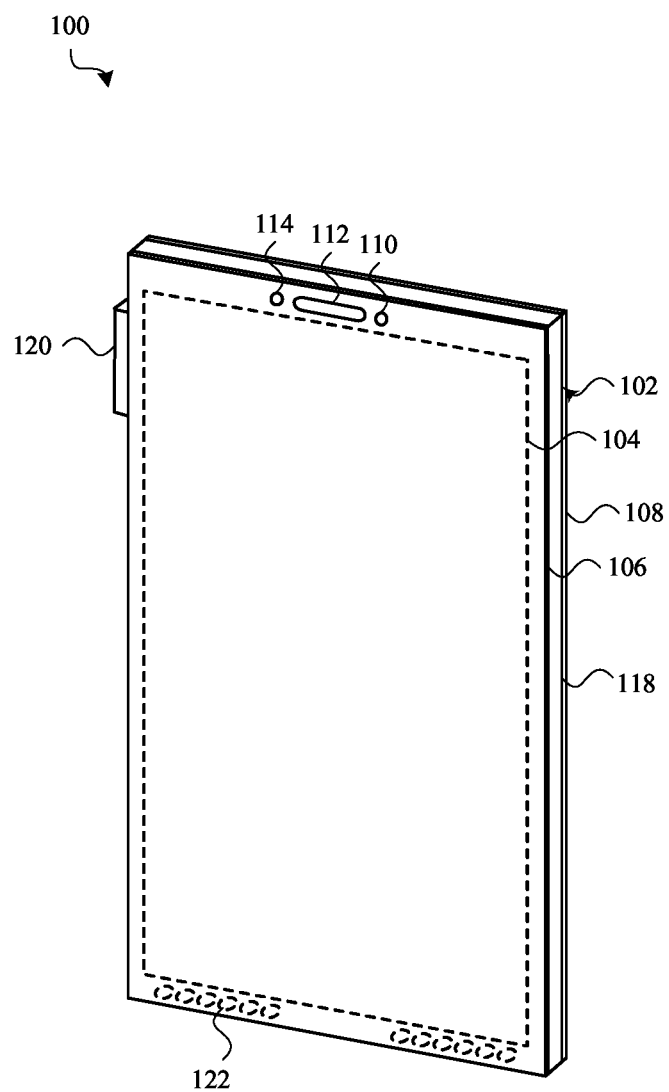
FIGS. 1A and 1B show an example of a device that may include an optical sensor system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments and appended claims.

The operation of an optical transmitter, such as a laser or LED, often requires compliance with a set of predefined performance specifications. Compliance with predefined performance specifications (e.g., ensuring that an average operating current of an optical transmitter stays below an overcurrent protection (OCP) limit) is typically handled on the transmit side (e.g., by an optical transmitter controller). Furthermore, all of the predefined performance specifications that need to be monitored, and all of the operating scenarios for which they need to be monitored, are typically aggregated—which means that an optical transmitter is operated under a set of conditions that would satisfy the predefined performance specifications in any mode under which the optical transmitter is operated. As a result, there are sets of operating parameters under which an optical transmitter may be properly operated, but because one or more individual parameters in the set may not meet the predefined performance specifications when combined with other parameters that are not in the set, the set of operating parameters is prohibited from use.

One advantage of some of the systems, devices, methods, and apparatus described in the present disclosure is that they can enable an optical transmitter to be used with a wider range of parameter sets, under control (and in many cases, under hardware control) of an optical sensor system's receive side. If, in some cases, an optical transmitter may be operated at a higher optical transmit power, the signal-to-noise ratio (SNR) of an optical receiver's output may be increased.

Another advantage of some of the systems, devices, methods, and apparatus described herein is that they do not rely on optical pulse counting. Although optical pulse counting is one way to monitor compliance with predefined performance specifications, optical pulse counting becomes impractical and/or costly in high frequency optical sensor systems such as high frequency time-of-flight (ToF) optical sensor systems.

In some of the described systems, devices, methods, and apparatus, an optical receiver controller may provide signals or instructions that help ensure an optical transmitter's compliance with predefined performance specifications. However, an optical transmitter and/or optical transmitter controller may independently (and primarily, or even solely) control an average operating current of the optical transmitter and ensure compliance with a preconfigured or programmable OCP limit.

Because errors from firmware are unavoidable, the proposed systems, devices, methods, and apparatus rely on hardware to achieve compliance with predefined performance specifications, such that delays and errors associated with firmware communication can be avoided.

Systems, devices, methods, and apparatus capable of providing the above advantages and/or other advantages are described with reference to FIGS. 1A-9. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", and so on is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Figure 1B:
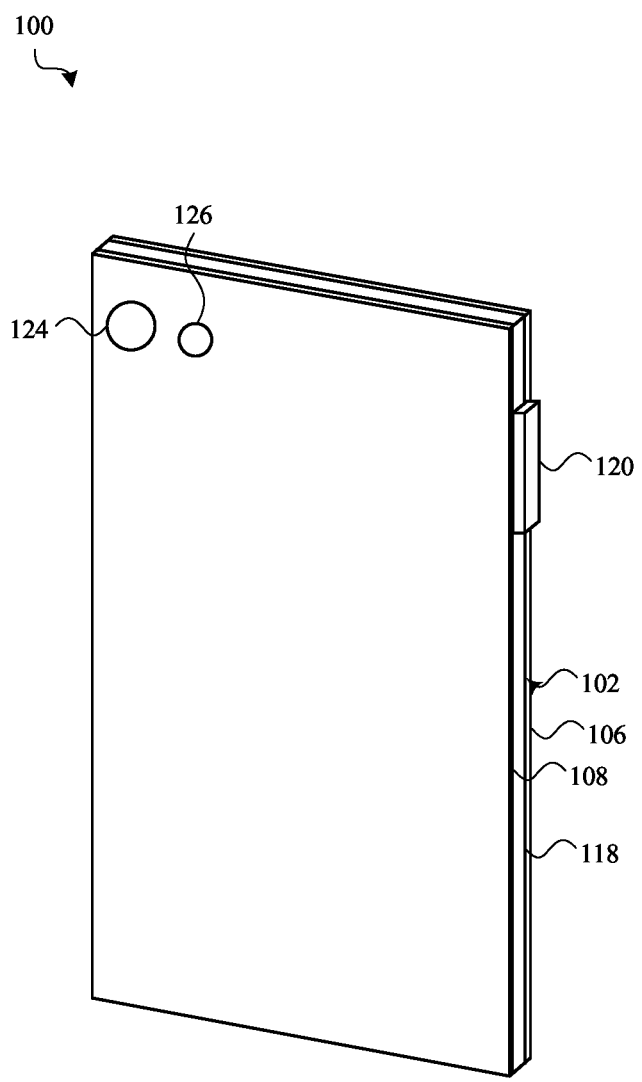

FIGS. 1A and 1B show an example of a device 100 that may include an optical sensor system, such as a 3D image sensor or depth sensor. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable or mobile electronic device including, for example, a mobile phone, a tablet computer, a portable computer, a portable music player, a wearable device (e.g., an electronic watch, a health monitoring device, or a fitness tracking device), an augmented reality (AR) device, a virtual reality (VR) device, a mixed reality (MR) device, a gaming device, a portable terminal, a digital single-lens reflex (DSLR) camera, a video camera, a vehicle navigation system, a robot navigation system, or any other type of portable or mobile electronic device. The device 100 could also be a device that is permanently installed or semi-permanently located at a single location. FIG. 1A shows a front isometric view of the device 100, and FIG. 1B shows a rear isometric view of the device 100. The device 100 may include a housing 102 that at least partially surrounds a display 104. The housing 102 may include or support a front cover 106 and/or a rear cover 108. The front cover 106 may be positioned over the display 104 and may provide a window through which the display 104 may be viewed. In some embodiments, the display 104 may be attached to (or abut) the housing 102 and/or the front cover 106. In alternative embodiments of the device 100, the display 104 may not be included and/or the housing 102 may have an alternative configuration.

The display 104 may include one or more light-emitting elements, and in some cases may be a light-emitting diode (LED) display, an organic LED (OLED) display, a liquid crystal display (LCD), an electroluminescent (EL) display, or another type of display. In some embodiments, the display 104 may include, or be associated with, one or more touch and/or force sensors that are configured to detect a touch and/or a force applied to a surface of the front cover 106.

The various components of the housing 102 may be formed from the same or different materials. For example, a sidewall 118 of the housing 102 may be formed using one or more metals (e.g., stainless steel), polymers (e.g., plastics), ceramics, or composites (e.g., carbon fiber). In some cases, the sidewall 118 may be a multi-segment sidewall including a set of antennas. The antennas may form structural components of the sidewall 118. The antennas may be structurally coupled (to one another or to other components) and electrically isolated (from each other or from other components) by one or more non-conductive segments of the sidewall 118. The front cover 106 may be formed, for example, using one or more of glass, a crystal (e.g., sapphire), or a transparent polymer (e.g., plastic) that enables a user to view the display 104 through the front cover 106. In some cases, a portion of the front cover 106 (e.g., a perimeter portion of the front cover 106) may be coated with an opaque ink to obscure components included within the housing 102. The rear cover 108 may be formed using the same material(s) that are used to form the sidewall 118 or the front cover 106. In some cases, the rear cover 108 may be part of a monolithic element that also forms the sidewall 118 (or in cases where the sidewall 118 is a multi-segment sidewall, those portions of the sidewall 118 that are conductive or non-conductive). In still other embodiments, all of the exterior components of the housing 102 may be formed from a transparent material, and components within the device 100 may or may not be obscured by an opaque ink or opaque structure within the housing 102.

The front cover 106 may be mounted to the sidewall 118 to cover an opening defined by the sidewall 118 (i.e., an opening into an interior volume in which various electronic components of the device 100, including the display 104, may be positioned). The front cover 106 may be mounted to the sidewall 118 using fasteners, adhesives, seals, gaskets, or other components.

A display stack or device stack (hereafter referred to as a "stack") including the display 104 may be attached (or abutted) to an interior surface of the front cover 106 and extend into the interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 106 (e.g., to a display surface of the device 100).

In some cases, a force sensor (or part of a force sensor system) may be positioned within the interior volume above, below, and/or to the side of the display 104 (and in some cases within the device stack). The force sensor (or force sensor system) may be triggered in response to the touch sensor detecting one or more touches on the front cover 106 (or a location or locations of one or more touches on the front cover 106), and may determine an amount of force associated with each touch, or an amount of force associated with a collection of touches as a whole. In some embodiments, the force sensor (or force sensor system) may be used to determine a location of a touch, or a location of a touch in combination with an amount of force of the touch. In these latter embodiments, the device 100 may not include a separate touch sensor.

As shown primarily in FIG. 1A, the device 100 may include various other components. For example, the front of the device 100 may include one or more optical sensor systems (e.g., one or more front-facing cameras 110 (including, for example, one or more 3D image sensors or depth sensors), a proximity sensor, a particle sensor, and so on), speakers 112, microphones, or other components 114 (e.g., audio, imaging, and/or sensing components) that are configured to transmit signals from and/or receive signals into the device 100. In some cases, a front-facing camera 110 or other optical sensor system, alone or in combination with other sensors, may be configured to operate as one or more of a bio-authentication or facial recognition sensor, a proximity sensor, a depth sensor, a particle sensor, and so on. In some embodiments, the front-facing camera 110 or other optical sensor system may include a flash or other light source (e.g., a visible or invisible (e.g., infrared (IR)) light source) that provides structured or flood illumination. In some cases, the front-facing camera 110 or other optical sensor system may be positioned adjacent the display 104, as shown. The front-facing camera 110 or other optical sensor system may alternatively (or also) be positioned behind the display 104 and receive visible and/or invisible light through the display 104. In some cases, an optical sensor system configured as a depth sensor may be used to determine a distance to a user and/or generate a depth map of the user's face, or to determine a distance or proximity to an object and/or generate a depth map of the object (or a depth map of a field of view (FoV) that includes the object).

The device 100 may also include buttons or other input devices positioned along the sidewall 118 and/or on a rear surface of the device 100. For example, a volume button or multipurpose button 120 may be positioned along the sidewall 118, and in some cases may extend through an aperture in the sidewall 118. The sidewall 118 may include one or more ports 122 that allow air, but not liquids, to flow into and out of the device 100. In some embodiments, one or more sensors may be positioned in or near the port(s) 122. For example, an ambient pressure sensor, ambient temperature sensor, internal/external differential pressure sensor, gas sensor, particulate matter concentration sensor, or air quality sensor may be positioned in or near a port 122.

In some embodiments, the rear surface of the device 100 may also include one or more optical sensor systems (e.g., one or more rear-facing cameras 124 (including, for example, one or more 3D image sensors or depth sensors), a proximity sensor, a particle sensor, and so on; (see FIG. 1B). In some embodiments, the rear-facing camera 124 or other optical sensor system may include a flash or other light source 126 (e.g., a visible or invisible (e.g., IR) light source) that provides structured or flood illumination. In some cases, the rear surface of the device 100 may include multiple rear-facing cameras or other optical sensor systems.

Figure 2:
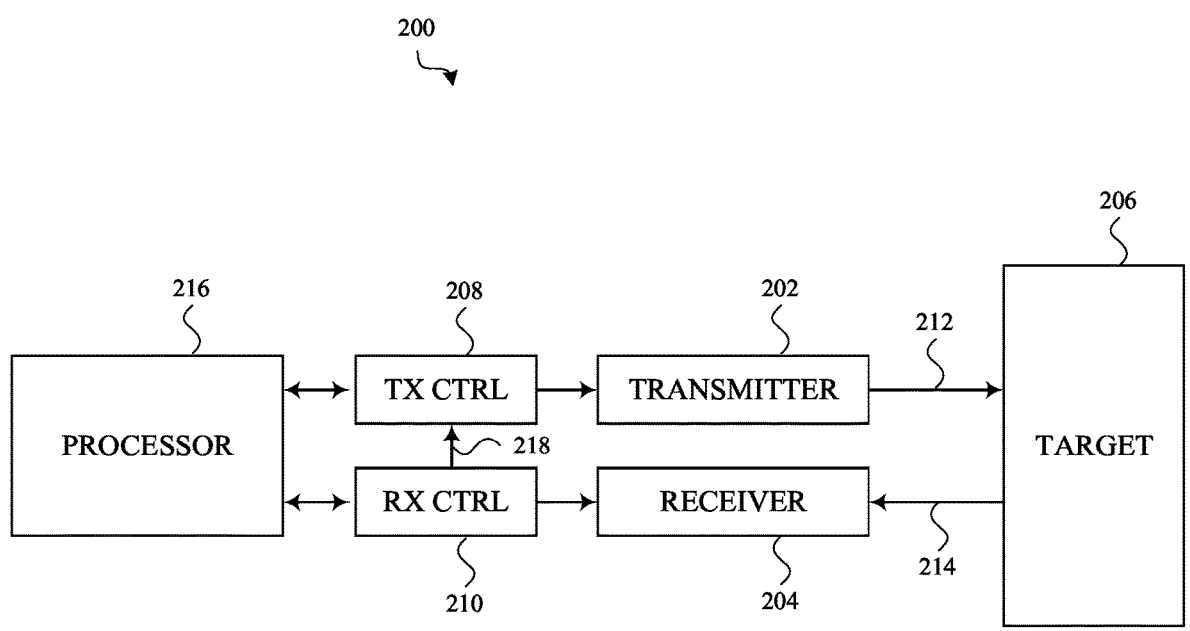
FIGS. 2-4 show example optical sensor systems.

FIG. 2 shows an example optical sensor system 200. The optical sensor system 200 is an example of any of the optical sensor systems described with reference to FIGS. 1A and 1B. The optical sensor system 200 includes an optical transmitter 202 (or equivalently, an optical emitter) and an optical receiver 204 (or equivalently, an optical detector). The optical transmitter 202 and optical receiver 204 may be positioned in close proximity to one another, but relatively far from a target 206 (that is, relatively far compared to a distance between the optical transmitter 202 and the optical receiver 204). In some embodiments, the optical transmitter 202 and optical receiver 204 may be provided as (e.g., housed in) a single module. In other embodiments, the optical transmitter 202 and optical receiver 204 may be separately housed, or mounted to the same or different substrates (e.g., the same or different printed circuit boards (PCBs) or flexible circuit substrates). The optical transmitter 202 may be positioned to emit optical pulses (photons) toward the target 206 or into a FoV, and the optical receiver 204 may be positioned to detect returns (e.g., reflections or scatter) of the optical pulses (photons) from the target 206.

The optical transmitter 202 may take various forms, and in some embodiments may include a vertical-cavity surface-emitting laser (VCSEL), a vertical external-cavity surface-emitting laser (VECSEL), a quantum-dot laser (QDL), a quantum cascade laser (QCL), a light-emitting diode (LED) (e.g., an organic LED (OLED), a resonant-cavity LED (RC-LED), a micro LED (mLED), a superluminescent LED (SLED), or an edge-emitting LED), any/or any other form of laser or LED, and so on.

The optical receiver 204 may take various forms, and may include a photodetector, an array of photodetectors, a single-photon avalanche diode (SPAD), and/or an array of SPADs, and so on.

An optical transmitter controller (TX CTRL) 208 may be operably connected to the optical transmitter 202, and an optical receiver controller (RX CTRL) 210 may be operably connected to the optical receiver 204. The optical transmitter controller 208 may be configured to operate the optical transmitter 202 (e.g., control when and how the optical transmitter 202 emits optical pulses). Emitted optical pulses are represented by the arrow 212. The optical receiver controller 210 may be configured to operate the optical receiver 204 (e.g., control when and how the optical receiver 204 senses a returned portion of an optical pulse). A returned portion of an optical pulse is represented by the arrow 214. A processor 216 may communicate with and control each of the optical transmitter controller 208 and the optical receiver controller 210.

When the optical receiver 204 includes one or more SPADs, photons emitted by the optical transmitter 202 and returned (e.g., reflected or scattered) from the target 206 may cause avalanche events in one or more pixels of the optical receiver 204. The timing(s) of such avalanche events may be recorded and compared to the time(s) when photons were emitted. For example, the processor 216 may receive 1) signals (e.g., times of avalanche events) output by the optical receiver 204, and 2) times of photon emissions made by the optical transmitter 202. The processor 216 may use the various times to determine times-of-flight (ToFs) of photons emitted by the optical transmitter 202 and received by the optical receiver 204. The ToFs may be used to determine distances between individual pixels of the optical receiver 204 and the target 206. The distances can be used to generate a 3D image or depth map of the target 206.

To ensure that the optical transmitter 202 is operated properly (e.g., in compliance with predefined performance specifications), the optical receiver controller 210 may monitor an output of the optical transmitter 202 (in a secondary capacity) for compliance with a set of predefined performance specifications, and provide a fault indication to the optical transmitter controller 208 upon identifying a non-compliance with at least one of the predefined performance specifications. However, the optical transmitter 202 or optical transmitter controller 208 may primarily (or even solely) ensure compliance with the set of predefined performance specifications. The optical receiver controller 210 may also provide, to the optical transmitter controller 208, one or more settings or parameters for operating the optical transmitter 202. For example, the optical receiver controller 210 may provide to the optical transmitter controller 208, over one or more communication channels 218, a number of optical sensing banks, a number of PRIs per optical sensing bank, an indicator of a next PRI, an indication of when to use the next PRI, and so on, as described, for example, with reference to other figures. In this manner, the optical receiver controller 210 provides some amount of control over the operation of the optical transmitter 202. However, the predefined performance specifications may in some cases be hardcoded in the optical transmitter 202 (e.g., at the factory) so that miscommunication between the optical receiver controller 210 and optical transmitter controller 208, over the one or more communication channels 218, does not compromise enforcement of the predefined performance specifications (e.g., the optical transmitter 202 and/or transmit side of the optical sensor system 200 may enforce the predefined performance specifications independently of the receive side of the optical sensor system 200).

The described components and operation of the optical sensor system 200 are exemplary. In alternative embodiments, the optical sensor system 200 may include a different combination or configuration of components, or may perform additional or alternative functions.

In addition to providing an example of the optical sensor systems described with reference to FIGS. 1A and 1B, the optical sensor system 200 may be incorporated into various types of electronic devices, such as: any portable or mobile electronic device including, for example, a mobile phone, a tablet computer, a portable computer, a portable music player, a wearable device (e.g., an electronic watch, a health monitoring device, or a fitness tracking device), an AR device, a VR device, an MR device, a gaming device, a portable terminal, a DSLR camera, a video camera, a vehicle navigation system, a robot navigation system, or any other type of portable or mobile electronic device; or any electronic device that is permanently installed or semi-permanently located at a single location.

Figure 3:
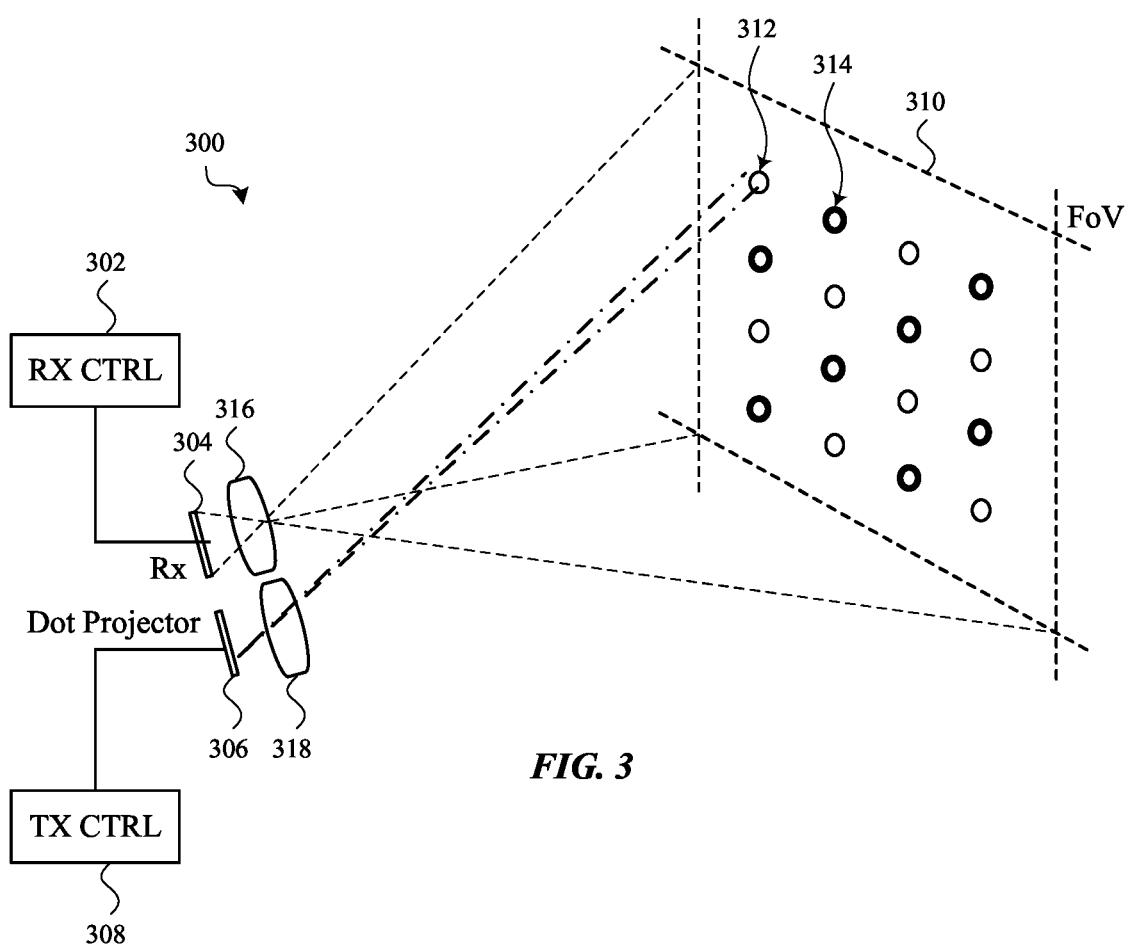

FIG. 3 shows an example optical sensor system 300. The optical sensor system 300 is an example of any of the optical sensor systems described with reference to FIGS. 1A-1B and 2.

The optical sensor system 300 includes a set of optical receivers 302. The set of optical receivers 302 may be distributed between a set of optical sensing banks. That is, each optical sensing bank in the set of optical sensing banks may include a respective different subset of optical receivers in the set of optical receivers 302. In some cases, each of the optical receivers may be variously configured as a photodetector or SPAD, and in some cases may include a time-of-flight detector. In some embodiments, the set of optical receivers 302 may include an array of photodetectors or SPADs. The set of optical receivers 302 may be operated by an optical receiver controller 304.

The optical sensor system 300 also includes a set of one or more optical transmitters 306, which optical transmitters may be distributed between the set of optical sensing banks and/or reconfigured at different times to emit optical pulses in different patterns. Each optical transmitter may include one of a laser, an LED, and so on. The set of one or more optical transmitters 306 may be operated by an optical transmitter controller 308. In some embodiments, the relationships between optical receivers, optical transmitters, and optical sensing banks (e.g., the allocation of optical receivers and optical transmitters to optical sensing banks) may be configurable (e.g., to provide different sensing modes, for purposes of calibration over time, and so on). In other embodiments, the relationships between optical receivers, optical transmitters, and optical sensing banks may be fixed.

In some embodiments, and as shown, the set of one or more optical transmitters 306 may be included in (or operated as) a dot projector. In a first number of time intervals, the optical transmitter controller 308 may enable at least one optical transmitter in the set of one or more optical transmitters 306. The at least one optical transmitter may be associated with a first optical sensing bank, and may emit one or more optical pulses that illuminate a FoV 310 with a first set of dots 312. Similarly, the optical receiver controller 304 may enable a subset of optical receivers, which subset of optical receivers is also associated with the first optical sensing bank. The enabled subset of optical receivers may sense redirections of the emitted optical pulses (e.g., portions of emitted optical pulses that reflect or scatter off of a target in the FoV 310). Optionally, optical pulses may be emitted through a first set of one or more optical components 316 (e.g., lenses or filters) and received through a second set of one or more optical components 318 (e.g., lenses or filters).

In a second number of time intervals, the optical transmitter controller 308 may enable a different one or more optical transmitters in the set of one or more optical transmitters 306; or alternatively, the optical transmitter controller 308 may reconfigure the same one or more optical transmitters that were enabled in the first number of time intervals, such that the set of one or more optical transmitters 306 illuminates the FoV 310 with a second set of dots 314 in the second number of time intervals. The enabled optical transmitter(s) may be associated with a second optical sensing bank. Similarly, the optical receiver controller 304 may enable a subset of optical receivers, which subset of optical receivers is also associated with the second optical sensing bank. The enabled subset of optical receivers may sense redirections of emitted optical pulses (e.g., portions of emitted optical pulses that reflect or scatter off of a target in the FoV 310).

In some embodiments, the optical sensor system 300 may have optical transmitters and optical receivers associated with other optical sensing banks, which may be enabled, bank-by-bank, similarly to how the optical transmitters and optical receivers associated with the first and second optical sensing banks are enabled. In some embodiments, the optical sensor system 300 may alternately enable the components of the first optical sensing bank and the components of the second optical sensing bank.

In some embodiments, one or more optical components (e.g., one or more lenses or optical filters) may be positioned in the optical emission path(s) of the optical transmitter(s). In some embodiments, one or more optical components (e.g., one or more lenses or filters) may also or alternatively be positioned in the optical reception path(s) of the optical receivers.

Figure 4:
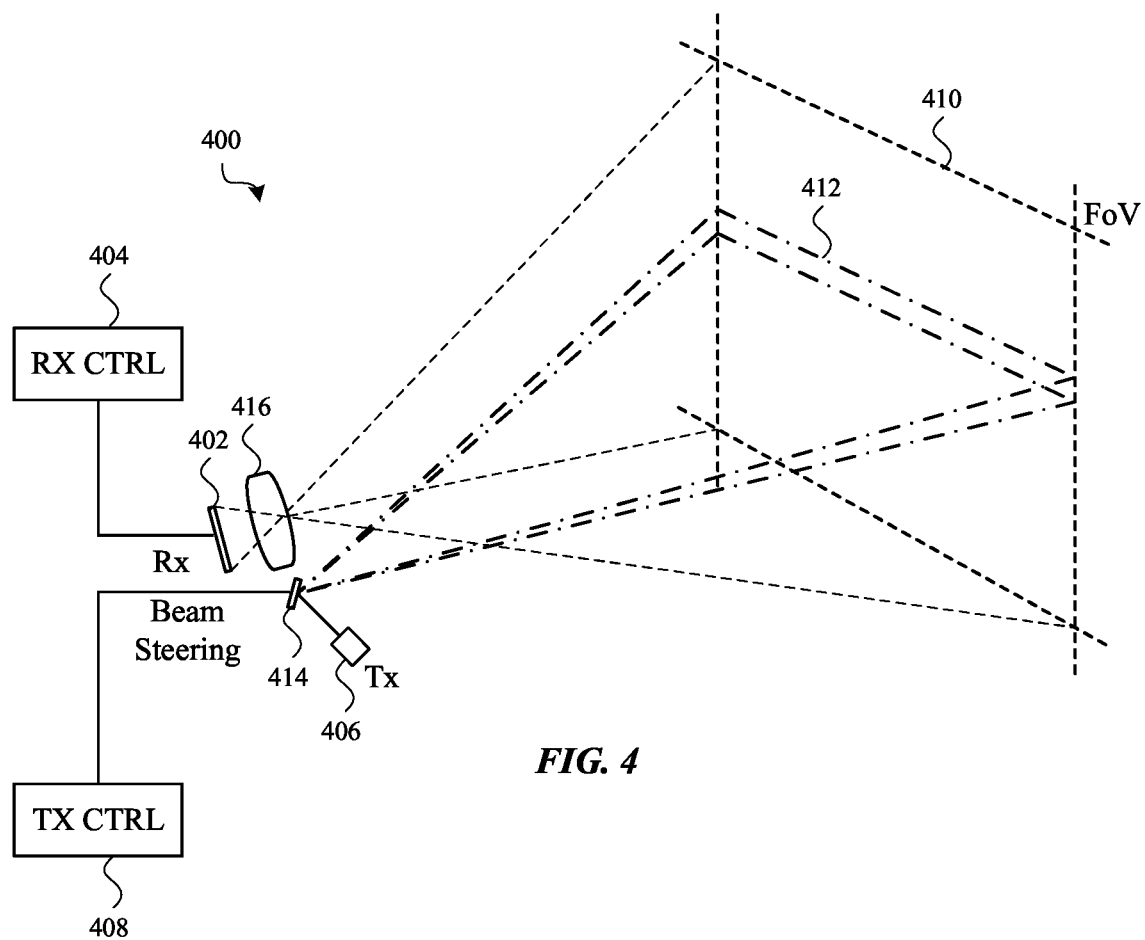

FIG. 4 shows another example optical sensor system 400. The optical sensor system 400 is an example of any of the optical sensor systems described with reference to FIGS. 1A-1B and 2.

The optical sensor system 400 includes a set of optical receivers 402. The set of optical receivers 402 may be distributed between a set of optical sensing banks. That is, each optical sensing bank in the set of optical sensing banks may include a respective different subset of optical receivers in the set of optical receivers 402. In some cases, each of the optical receivers may be variously configured as a photodetector or SPAD. In some embodiments, the set of optical receivers 402 may include an array of photodetectors or SPADs. The set of optical receivers 402 may be operated by an optical receiver controller 404.

The optical sensor system 400 also includes a set of one or more optical transmitters 406, which optical transmitters may be distributed between the set of optical sensing banks and/or reconfigured at different times to emit optical pulses in different patterns. Each optical transmitter may include one of a laser, an LED, and so on. The set of one or more optical transmitters 406 may be operated by an optical transmitter controller 408.

In some embodiments, and as shown, the set of one or more optical transmitters 406 may be included in (or operated as) a line projector (or alternatively, a line scan system). In a first number of time intervals, the optical transmitter controller 408 may enable at least one optical transmitter in the set of one or more optical transmitters 406. The at least one optical transmitter may be associated with a first optical sensing bank, and may emit optical pulses that illuminate a FoV 410 with a first set of lines (including, for example, the line 412). Similarly, the optical receiver controller 404 may enable a subset of optical receivers, which subset of optical receivers is also associated with the first optical sensing bank. The enabled subset of optical receivers may sense redirections of the emitted optical pulses (e.g., portions of emitted optical pulses that reflect or scatter off of a target in the FoV 410). Optionally, optical pulses may be emitted onto (or through) a first set of one or more optical components 414 (e.g., reflectors, lenses, or filters) and received through a second set of one or more optical components 416 (e.g., lenses or filters).

In a second number of time intervals, the optical transmitter controller 408 may enable a different one or more optical transmitters in the set of one or more optical transmitters 406; or alternatively, the optical transmitter controller 408 may reconfigure the same one or more optical transmitters that were enabled in the first number of time intervals, such that the set of one or more optical transmitters 406 illuminates the FoV 410 with a second set of lines in the second number of time intervals. The enabled optical transmitter(s) may be associated with a second optical sensing bank. Similarly, the optical receiver controller 404 may enable a subset of optical receivers, which subset of optical receivers is also associated with the second optical sensing bank. The enabled subset of optical receivers may sense redirections of emitted optical pulses (e.g., portions of the emitted optical pulses that reflect or scatter off of a target in the FoV 410).

In some embodiments, the optical sensor system 400 may have optical transmitters and optical receivers associated with other optical sensing banks, which may be enabled, bank-by-bank, similarly to how the optical transmitters and optical receivers associated with the first and second optical sensing banks are enabled. In some embodiments, the optical sensor system 400 may alternately enable the components of the first optical sensing bank and the components of the second optical sensing bank.

In some embodiments, one or more optical components (e.g., one or more lenses or optical filters) may be positioned in the optical emission path(s) of the optical transmitter(s). In some embodiments, one or more optical components (e.g., one or more lenses or filters) may also or alternatively be positioned in the optical reception path(s) of the optical receivers.

In each of the optical sensor systems described in FIGS. 1A-1B and 2 and elsewhere, the optical transmitter(s) and optical receivers of an optical sensor system may be operated with or without the concept of optical sensing banks. That is, the optical transmitter(s) and optical receivers of an optical sensor system may be distributed among multiple different optical sensing banks, with the optical transmitter(s) and optical receivers associated with different optical sensing banks being enabled at different times or, alternatively, the optical transmitter(s) and optical receivers of an optical sensor system may be operated without the concept of optical sensing banks (or equivalently, operated as part of a single optical sensing bank). By enabling the optical transmitter(s) and optical receivers of different optical sensing banks at different times, power may be conserved, predefined performance specifications may be more easily met, and so on.

In an optical sensor system such as a depth sensor, which may include one or more optical transmitters (e.g., lasers or LEDs) and one or more optical receivers (e.g., SPADs), each optical receiver (or SPAD) may be used to determine a time-of-arrival (ToA) or time-of-flight (ToF) of one or a small number of photons emitted by one or more of the optical transmitter(s). A ToA may be determined, for example, as the time an avalanche occurs in a SPAD. A ToF may be determined using the ToA in combination with a time of emission (ToE; or the time a photon is emitted by an optical transmitter). In some cases, an optical transmitter may emit an optical pulse (one or more photons) at a time T1, and an optical receiver may monitor for a return of the pulse (e.g., a reflection or scatter of the pulse off of an object (or target) in a FoV) up until a time T2. In some cases, the optical receiver may detect a return of the pulse at a time T3, between the times T1 and T2. The emitter may emit another optical pulse at time T2, and the optical receiver may again monitor for a return of the pulse. The time period defined between T1 and T2, or between T2 and the emission of a next optical pulse, may be referred to as a PRI.

Figure 5:
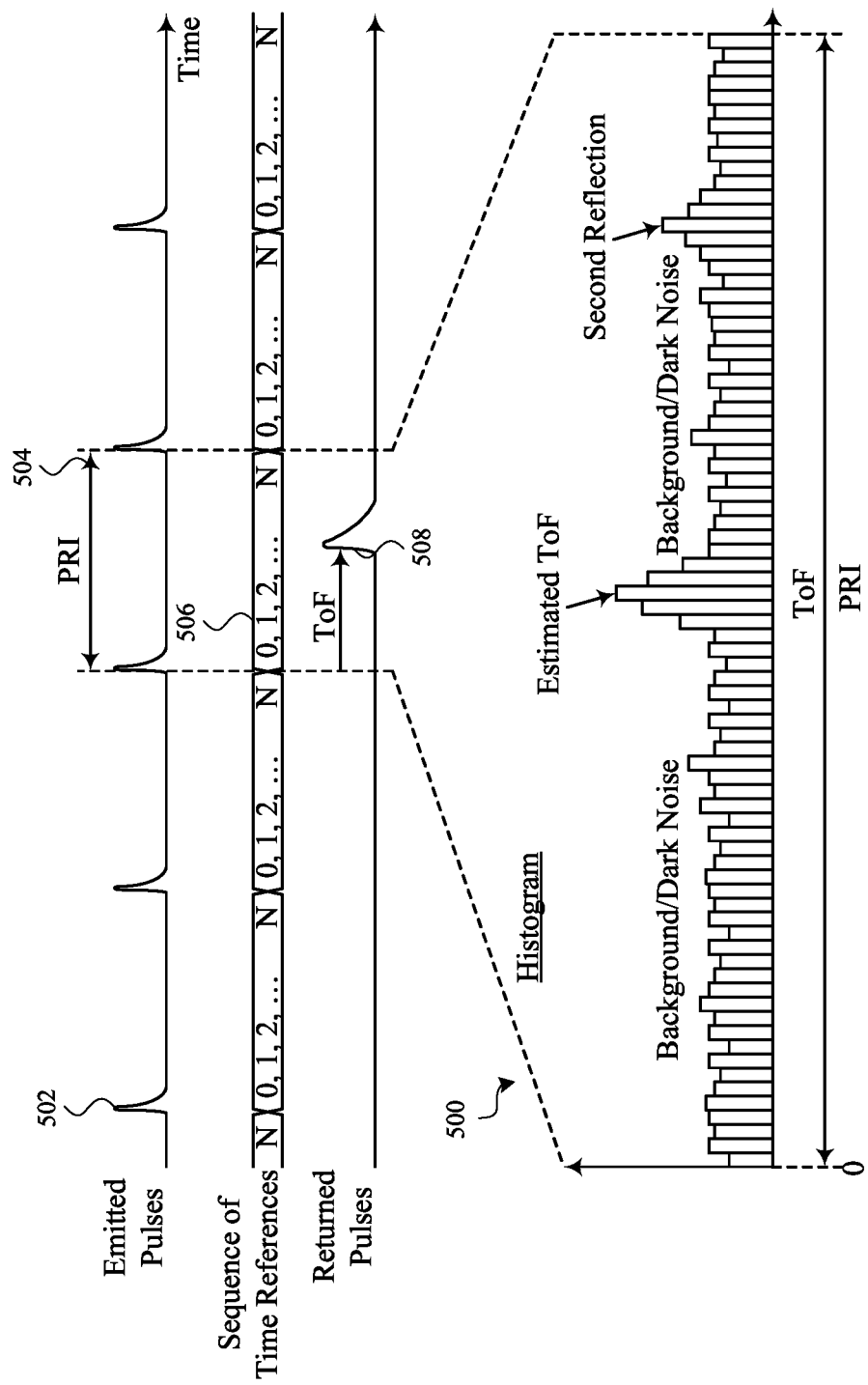
FIG. 5 shows an example timing relationship between various components of an optical sensor system.

FIG. 5 shows an example timing relationship between various components of an optical sensor system, such as a SPAD-based optical sensor system, depth sensor, or ToF sensor. FIG. 5 also shows an example ToF histogram 500 that may be generated from the output of a SPAD in such an optical sensor system.

As described with reference to FIGS. 1A-4, an optical sensor system may include an optical transmitter configured to emit a sequence of optical pulses 502. The optical pulses 502 may in some cases be equally spaced in time, and may be separated by a regular time interval 504 (e.g., a PRI). In some cases, an optical transmitter may emit a series of optical pulses, in accordance with a particular PRI, for a predetermined or configurable period of time, at which time the optical transmitter ceases emitting optical pulses for a period of time and/or is reconfigured to emit optical pulses in accordance with a next PRI that differs from the previous PRI.

During or after the emission of each pulse 502, or in some cases before emission of the pulse 502, but during a time interval in which the pulse 502 is emitted, a sequence of time references 506 may be provided to a time-to-digital converter (TDC) coupled to an optical receiver (e.g., a SPAD). The sequence of time references 506 may have a known relationship to the time interval in which the pulse 502 is emitted, and a known relationship to the pulse 502. The known relationship may be established, for example, by starting the sequence of time references 506 (e.g., resetting or initializing a counter that generates the sequence of time references 506) in sync with the emission time of the pulse 502. The sequence of time references 506 is shown as a sequence of integer values in FIG. 5 (e.g., 0, 1, 2, . . . ), but may take the form of a binary count or other sequence.

An emitted optical pulse 502 may propagate into a FoV unless or until it impinges on an object or target in the FoV, in which case a portion or all of the photons in the pulse 502 may be returned toward an optical receiver (e.g., a SPAD) as a reflected pulse 508. Upon one or a small number of photons being received by (or arriving at) a SPAD, the SPAD may experience an avalanche condition and generate an avalanche timing output signal in response to the avalanche condition. Upon receipt of the avalanche timing output signal, a TDC may capture (e.g., latch) a current time reference in the sequence of time references. The captured (e.g., latched) time reference may be used to update the histogram 500.

As shown, the histogram 500 may include a set of memory locations (e.g., memory addresses or bins) that store a respective set of counts. Each count may represent a number of time intervals, in a set of time intervals, in which the SPAD received one or more photons at a particular time of arrival (or range of times of arrival) and experienced an avalanche condition. Given a known time at which an optical pulse 502 was emitted during a particular time interval, the time reference captured by a TDC during the time interval, and a known relationship between the emission time of the optical pulse 502 and the sequence of time references 506, a round-trip ToF of a photon in the emitted pulse 502 may be estimated or determined. Thus, each memory location or count may correspond to a ToF (or range of ToFs). A maximum count may typically be assumed to be the ToF of a photon reflecting off an object in a FoV. Lower counts may typically be assumed to be noise (e.g., uncorrelated ambient light reflected from an object or target in the FoV, or reflections off of particles or other small objects passing through the FoV), secondary reflections of photons off the object, and so on.

Figure 6:
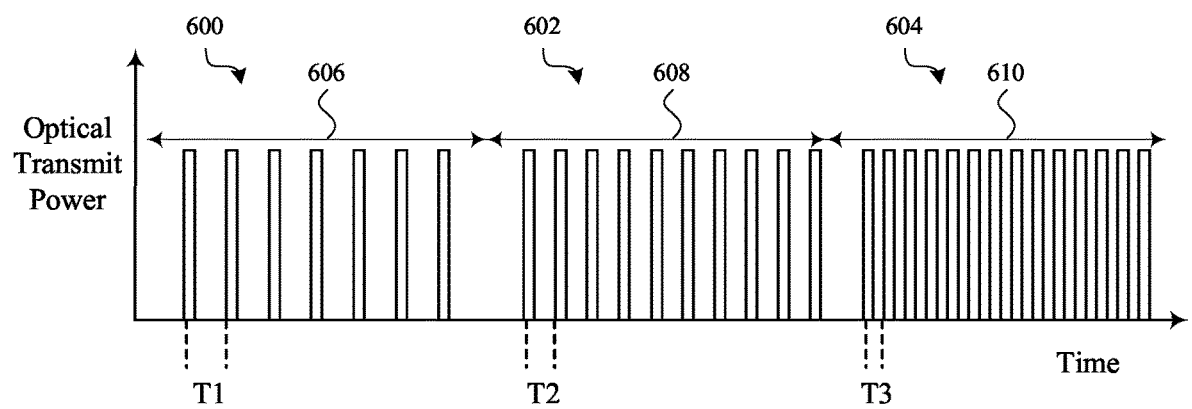
FIG. 6 shows example sets of different PRIs (e.g., first, second, and third sets of PRIs) having different periods.

As previously discussed, an optical transmitter may be configured to emit optical pulses in accordance with a first PRI for a period of time, and then emit optical pulses in accordance with a second PRI, different from the first PRI, for a subsequent period of time. Each of the first and second PRI may differ by one or more of optical transmit power, period, duty cycle, and so on. FIG. 6 shows example sets 600, 602, 604 of different PRIs (e.g., first, second, and third sets 600, 602, 604 of PRIs) having different periods (e.g., respective periods T1, T2, and T3). The first PRI may be repeated for a first period of time 606; the second PRI may be repeated for a second period of time 608; and the third PRI may be repeated for a third period of time 610. Different PRIs (e.g., PRIs in the different sets 600, 602, 604 of PRIs) may be associated with the same or different OCP limits and/or other parameters.

Figure 7:
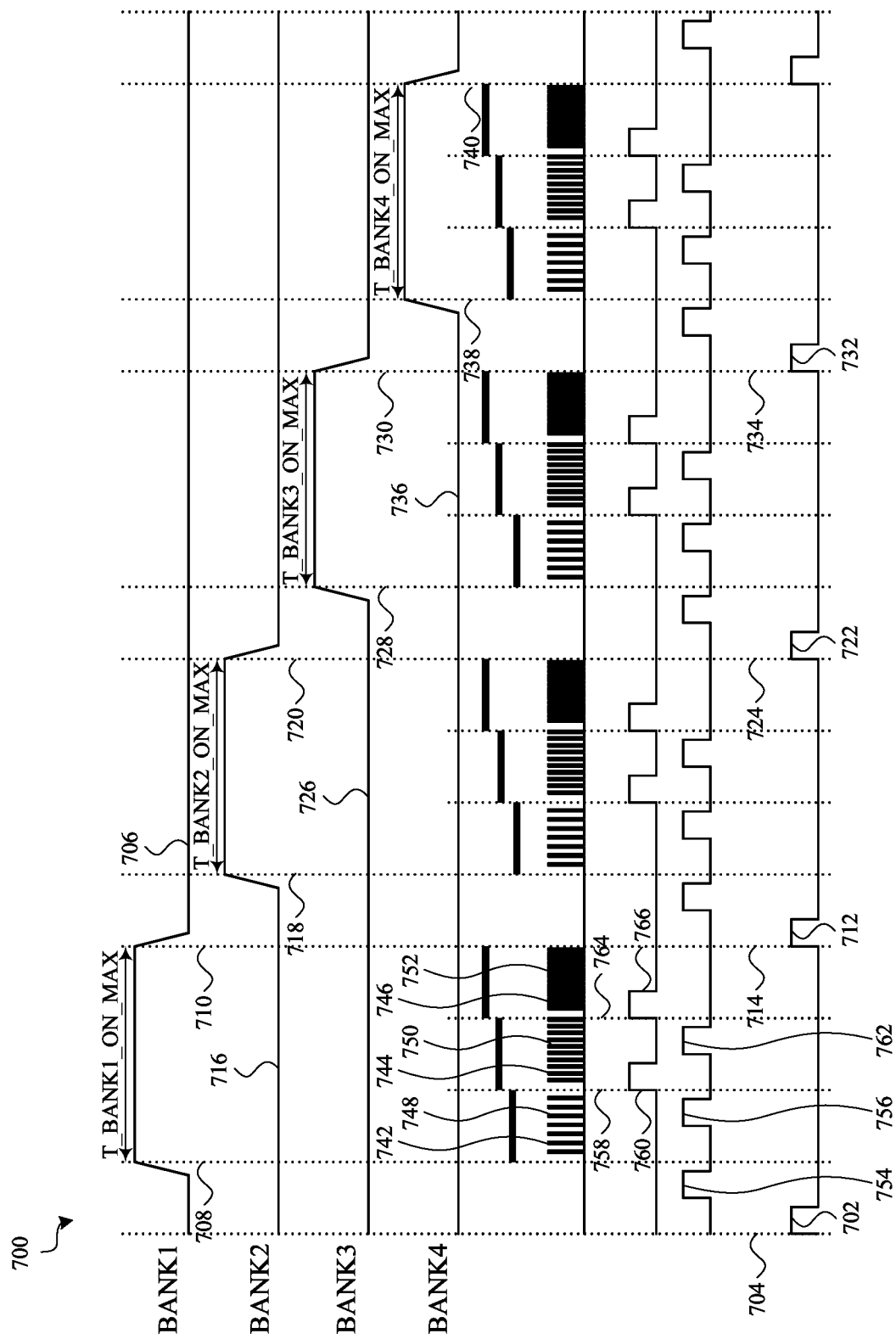
FIG. 7 shows an example timing diagram for operating an optical sensor system in accordance with different PRIs.

FIG. 7 shows an example timing diagram 700 for operating an optical sensor system in accordance with different PRIs. Although the timing diagram is for an optical sensor system that enables optical transmitter(s) and optical receiver(s) associated with different optical sensing banks at different times, the principles illustrated therein are also applicable to optical sensor systems that enable all of their optical transmitter(s) and optical receiver(s) contemporaneously (i.e., without the concept of optical sensing banks, or as part of a single optical sensing bank). The timing diagram shown in FIG. 7, or portions thereof, may be implemented by the optical transmitter controller and optical receiver controller described with reference to any of FIG. 2, 3, 4, 8, or 9.

An optical receiver controller may provide, to an optical transmitter controller, a set of bank enablement signals 702, 712, 722, and 732. After the optical receiver controller provides a first bank enablement signal 702 (e.g., a pulse) at time 704, the optical transmitter controller may transition a first bank signal (BANK1) 706 from a first state (e.g., a low state) to a second state (e.g., a high state) at time 708, with the time 708 following the time 704. The first bank signal 706 may remain at the second state for a predetermined or configurable period of time (T_BANK1_ON_MAX) and transition from the second state back to the first state at time 710, with the time 710 following the time 708. While the first bank signal 706 is at the second state, the optical transmitter(s) associated with the first bank are enabled and can be selectively enabled in accordance with one or more PRIs and other parameters. After the optical receiver controller provides a second bank enablement signal 712 (e.g., a pulse) at time 714, after time 710, the optical transmitter controller may transition a second bank signal (BANK2) 716 from the first state to the second state at time 718. The time 718 follows the time 714. The second bank signal 716 may remain at the second state for a predetermined or configurable period of time (T_BANK2_ON_MAX) and transition from the second state back to the first state at time 720. The time 720 follows the time 718. While the second bank signal 716 is at the second state, the optical transmitter(s) associated with the second bank are enabled and can be selectively enabled in accordance with one or more PRIs and other parameters. After the optical receiver controller provides a third bank enablement signal 722 (e.g., a pulse) at time 724, after time 720, the optical transmitter controller may transition a third bank signal (BANK3) 726 from the first state to the second state at time 728. The time 728 follows the time 724. The third bank signal 726 may remain at the second state for a predetermined or configurable period of time (T_BANK3_ON_MAX) and transition from the second state back to the first state at time 730. The time 730 follows the time 728. While the third bank signal 726 is at the second state, the optical transmitter(s) associated with the third bank are enabled and can be selectively enabled in accordance with one or more PRIs and other parameters. After the optical receiver controller provides a fourth bank enablement signal 732 (e.g., a pulse) at time 734, after time 730, the optical transmitter controller may transition a fourth bank signal (BANK4) 736 from the first state to the second state at time 738. The time 738 follows the time 734. The fourth bank signal 736 may remain at the second state for a predetermined or configurable period of time (T_BANK4_ON_MAX) and transition from the second state back to the first state at time 740. The time 740 follows the time 738. While the fourth bank signal 736 is at the second state, the optical transmitter(s) associated with the fourth bank are enabled and can be selectively enabled in accordance with one or more PRIs and other parameters.

When the optical transmitter(s) and optical receiver(s) associated with a particular optical sensing bank are enabled, the optical transmitter(s) and optical receiver(s) may be operated in accordance with a PRI. In some cases, they may be operated in accordance with a sequence of different PRIs. For example, the timing diagram 700 shows the optical transmitter(s) and optical receiver(s) associated with the first optical sensing bank being operated in accordance with a first PRI 742, then a second PRI 744, then a third PRI 746. Subsequently, the optical transmitter(s) and optical receiver(s) of each of the other optical sensing banks may be operated in accordance with first, second and third PRIs, which may be the same as, or different from, the first, second, and third PRIs 742, 744, 746 under which the optical transmitter(s) and optical receiver(s) of the first optical sensing bank are operated. In alternative embodiments, each optical sensing bank, when enabled, may be operated in accordance with a different number of PRIs.

Each of the first, second, and third PRIs 742, 744, 746 may have different parameters. For example, one or more of an overcurrent protection (OCP) limit, an optical transmit power, a maximum time for repeating the PRI, and so on may differ between different ones of the PRIs 742, 744, 746. By way of example, the timing diagram 700 shows the first PRI 742 to have a first OCP limit 748, while the second PRI 744 has a second OCP limit 750 that differs from the first OCP limit 748, and the third PRI 746 has a third OCP limit 752 that differs from both the first OCP limit 748 and the second OCP limit 750. OCP limits of the PRIs used for other optical sensing banks may be the same as, or different from, the first, second, and third OCP limits 748, 750, 752 used for the first, second, and third PRIs 742, 744, 746 used for the first optical sensing bank. Without the ability to change the OCP limit between different PRIs or optical sensing banks, an optical transmitter would be stuck applying, for the entire length of an exposure (i.e., the summed time duration of all PRIs), the lowest OCP limit that satisfies all modes of operation or use cases of the optical transmitter (i.e., all usable combinations of predefined performance specifications), which can cause significant degradation in an optical receiver's SNR. The ability to specify different PRI information, in a way that removes firmware error from the equation, enables hardware to apply different OCP limits and can improve the SNR of an optical receiver.

The optical receiver controller may further provide, to the optical transmitter controller, a set of indications 754, 756, 762 of the next PRI. In some cases, the indications 754, 756, 762 of the next PRI may be a set of pulses, with each pulse triggering a load of a next PRI in a round robin sequence of PRIs. In other embodiments, the indications 754, 756, 762 of the next PRI may be names, addresses, indices, or other indicators of next PRIs. In still other embodiments, the optical receiver controller may provide or update a set (or batch) of indications of next PRIs. In these embodiments, the optical receiver controller may separately indicate, to the optical transmitter controller, when to load each next PRI, or the optical transmitter controller may automatically retrieve (e.g., auto-cycle through) each next PRI after the expiration of a maximum time for repeating the current PRI.

After a first indication 754 of a next PRI (e.g., the first PRI 742) is provided to the optical transmitter controller, the next PRI (e.g., the first PRI 742) may be loaded and used at time 708, in response to the first bank signal 706 transitioning from the first state to the second state. The load and use of the first PRI 742 may thus be initiated in response to the first bank enablement signal 702. After a second indication 756 of a next PRI (e.g., the second PRI 744) is provided to the optical transmitter controller, the next PRI (e.g., the second PRI 744) may be loaded and used at time 758, in response to the optical receiver controller providing the optical transmitter controller a next PRI enablement signal 760. After a third indication 762 of a next PRI (e.g., the third PRI 746) is provided to the optical transmitter controller, the next PRI (e.g., the third PRI 746) may be loaded and used at time 764, in response to the optical receiver controller providing the optical transmitter controller a next PRI enablement signal 766. In this manner, the first bank enablement signal 706 and first and second next PRI enablement signals 760, 766 therefore function as a set of indications of when to use each next PRI. More generally, the set of indications of when to use each next PRI may include a first subset of bank enablement signals (including, e.g., the first, second, third, and fourth bank enablement signals 702, 712, 722, and 732) and a second subset of next PRI enablement signals (including, e.g., the first and second next PRI enablement signals 760, 766). In some cases, the bank enablement signals and next PRI enablement signals may be latch commands that cause the optical transmitter controller to load (i.e., retrieve) the next PRI.

Figure 8:
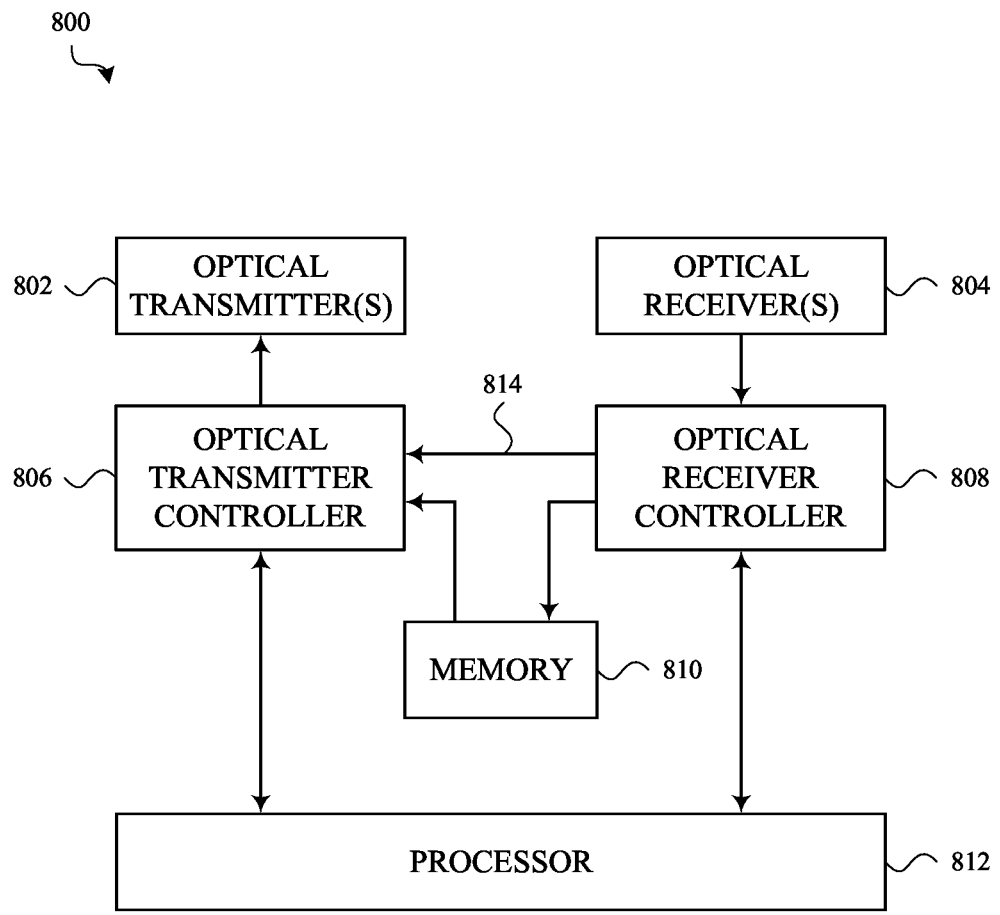
FIG. 8 shows an example block diagram of an optical sensor system.

FIG. 8 shows an example block diagram of an optical sensor system 800. The optical sensor system 800 is an example of the optical sensor systems described with reference to any of FIG. 1A-1B, 2, 3, 4, or 9, and in some cases may operate in accordance with the timing diagram described with reference to FIG. 7.

The optical sensor system 800 includes an optical transmitter 802 (or a set of optical transmitters, operable within or without one or more optical sensing banks) and an optical receiver 804 (or a set of optical receivers, operable within or without one or more optical sensing banks). The optical transmitter 802 may be controlled (or operated) by an optical transmitter controller 806, and the optical receiver 804 may be controlled (or operated) by an optical receiver controller 808. The optical sensor system 800 may further include a memory 810, which may include a singular memory module of a particular type, or multiple memory modules of the same or different type(s). For example, the memory 810 may include non-volatile and/or volatile memory.

The various components of the optical sensor system 800 may be provided as one or more discrete and/or integrated circuits (ICs). In some embodiments, at least the optical transmitter controller 806 may include, or be provided by, a first application-specific integrated circuit (ASIC), and the optical receiver controller 808 may include, or be provided by, a second ASIC.

The optical transmitter controller 806 and optical receiver controller 808 may in some cases be in communication with a processor 812 (e.g., a host processor). The processor 812 may transmit and receive signals, data, or instructions to/from the optical transmitter controller 806 and optical receiver controller 808, and in some cases be programmed by firmware.

The memory 810 may be configured to store an indicator of a next PRI, and a set of parameters associated with operating the optical transmitter in accordance with the next PRI. In some cases, one or both of the indicator or the set of parameters may be stored in a lookup table within the memory 810. The optical receiver controller 808 may be configured to provide the indicator of the next PRI. In some cases, the optical receiver controller 808 may provide the indicator of the next PRI by updating an indicator of the next PRI stored in the memory 810. The optical transmitter controller 806 may be configured to retrieve the indicator of the next PRI in response to a trigger signal 814 provided by the optical receiver controller 808. After retrieving the indicator of the next PRI, the optical transmitter controller 806 may use the indicator of the next PRI to retrieve the set of parameters associated with operating the optical transmitter 802 in accordance with the next PRI. The optical transmitter controller 806 may then operate the optical transmitter 802 in accordance with the set of parameters. The set of parameters may in some cases be provided (or stored in the memory 810) by, or at the direction of, the processor 812; or alternatively, the set of parameters may be written into the memory 810 at a time of manufacture or calibration. In the latter cases, the portion of the memory 810 into which the set of parameters is written may be a one-time programmable (OTP) memory, though the set of parameters may also be written into other types of memory. The set of parameters may be written into the memory 810 before, and typically well before, the optical receiver controller 808 provides or updates the indicator of the next PRI and/or provides the trigger signal that causes the optical transmitter controller 806 to retrieve the indicator of the next PRI. The set of parameters may include, for example, an OCP limit, PRI information, a maximum time for repeating the PRI, and so on.

By means of the optical receiver controller 808 providing the indicator of the next PRI, as well as the trigger signal that causes the optical transmitter controller 806 to retrieve the indicator of the next PRI, the optical receiver controller provides some amount or control over the optical transmitter controller's operation of the optical transmitter 802 (i.e., the receive side provides some amount of control over the transmit side). In some cases, the optical receiver controller 808 may be configured to monitor an output of the optical transmitter 802, in a secondary capacity, for compliance with a set of predefined performance specifications, such as an average optical receive power, and provide a fault indication to the optical transmitter controller 806 upon identifying a non-compliance with at least one of the predefined performance specifications. The optical receiver controller 808 may also withhold, delay, or change the indicator of the next PRI in response to its monitoring of the output of the optical transmitter 802.

The optical transmitter controller 806 may also monitor (or just control) the optical transmitter 802. For example, the set of parameters associated with operating the optical transmitter in accordance with the next PRI may include an OCP limit, and the optical transmitter controller 806 may be configured to cease an optical transmission of the optical transmitter 802 upon determining that an average operating current of the optical transmitter 802 exceeds the OCP limit. In some embodiments, compliance with the set of predefined performance specifications may be primarily (or even solely) controlled on the transmit side (e.g., by the optical transmitter 802 and/or optical transmitter controller 806).

As described with reference to FIG. 7, the optical receiver controller may provide indicators of different next PRIs at different times, and may provide indicators of different next PRIs for different optical sensing banks. The memory 810 may be configured to store different sets of parameters, which different sets of parameters are associated with operating the optical transmitter in accordance with respective different PRIs. Any one of the PRIs may be the next PRI indicated by the optical receiver controller 808. The different sets of parameters may include different OCP limits, though some of the parameter sets may include the same OCP limit and differ in other respects. The different sets of parameters may also specify different optical transmit powers, different duty cycles and/or periods of the optical transmitter 802, and so on.

In some embodiments, the optical receiver controller 808 may provide a series of indicators of next PRIs, or a series of updates to an indicator of a next PRI, one at a time. In other embodiments, the optical receiver controller 808 may provide or update a set of indicators of next PRIs. For example, the optical receiver controller 808 may provide or update, in a batch, indicators of the first, second, and third PRIs for the first optical sensing bank described with reference to FIG. 7. Regardless of whether the optical receiver controller 808 provides indicators of next PRIs individually or in a batch, the optical receiver controller 808 may sequentially provide to the optical transmitter controller 806, at different times, trigger signals that cause the optical transmitter controller 806 to retrieve each next PRI.

When the optical receiver controller 808 provides or updates a series of indicators of next PRIs, one at a time (i.e., iteratively), the optical receiver controller 808 may provide each indicator, or perform each update, while the optical transmitter controller 806 is operating the optical transmitter 802 in accordance with a current PRI.

Although some of the embodiments described herein are described with reference to a system that employs the same or different three PRIs for each of four optical sensing banks, the techniques described herein may be used in systems having any number of optical sensing banks (including no optical sensing banks, one optical sensing bank, or any number of two or more optical sensing banks) and any number of PRIs. In some cases, the optical receiver controller 808 described with reference to FIG. 8 may provide, to the optical transmitter controller 806 or the memory (e.g., for retrieval by the optical transmitter controller 806), one or both of a number of optical sensing banks, a number of PRIs per optical sensing bank, and so on.

Figure 9:
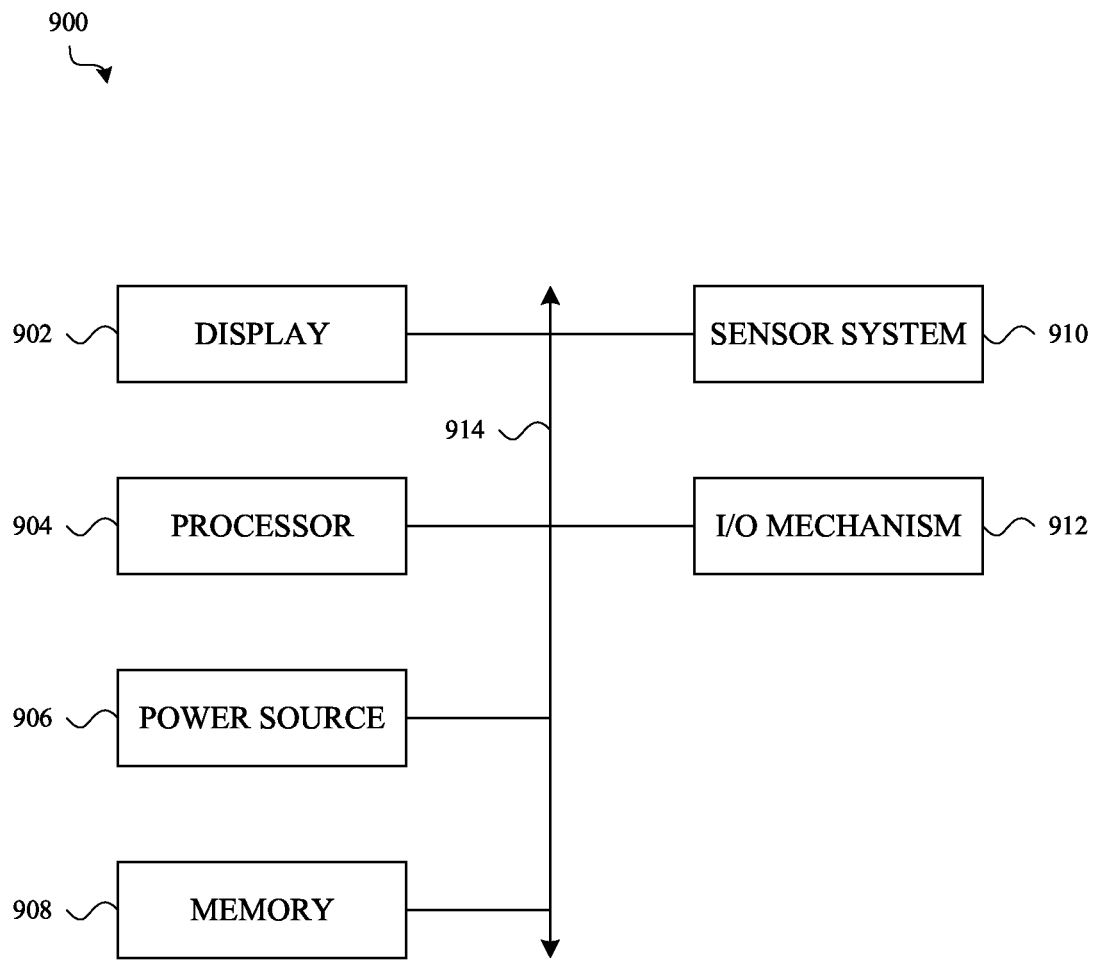
FIG. 9 shows a sample electrical block diagram of an electronic device.

FIG. 9 shows a sample electrical block diagram of an electronic device 900, which electronic device may in some cases be implemented as the device described with reference to FIGS. 1A and 1B. The electronic device 900 may include an electronic display 902 (e.g., a light-emitting display), a processor 904, a power source 906, a memory 908 or storage device, a sensor system 910, or an input/output (I/O) mechanism 912 (e.g., an input/output device, input/output port, or haptic input/output interface). The processor 904 may control some or all of the operations of the electronic device 900. The processor 904 may communicate, either directly or indirectly, with some or all of the other components of the electronic device 900. For example, a system bus or other communication mechanism 914 can provide communication between the electronic display 902, the processor 904, the power source 906, the memory 908, the sensor system 910, and the I/O mechanism 912.

The processor 904 may be implemented as any electronic device capable of processing, receiving, or transmitting data or instructions, whether such data or instructions is in the form of software or firmware or otherwise encoded. For example, the processor 904 may include a microprocessor, a central processing unit (CPU), an ASIC, a digital signal processor (DSP), a controller, or a combination of such devices. As described herein, the term "processor" is meant to encompass a single processor or processing unit, multiple processors, multiple processing units, or other suitably configured computing element or elements. In some cases, the processor 904 may function as the processor described with reference to FIG. 2 or 8.

It should be noted that the components of the electronic device 900 can be controlled by multiple processors. For example, select components of the electronic device 900 (e.g., the sensor system 910) may be controlled by a first processor and other components of the electronic device 900 (e.g., the electronic display 902) may be controlled by a second processor, where the first and second processors may or may not be in communication with each other.

The power source 906 can be implemented with any device capable of providing energy to the electronic device 900. For example, the power source 906 may include one or more batteries or rechargeable batteries. Additionally or alternatively, the power source 906 may include a power connector or power cord that connects the electronic device 900 to another power source, such as a wall outlet.

The memory 908 may store electronic data that can be used by the electronic device 900. For example, the memory 908 may store electrical data or content such as, for example, audio and video files, documents and applications, device settings and user preferences, timing signals, control signals, and data structures or databases. The memory 908 may include any type of memory. By way of example only, the memory 908 may include random access memory, read-only memory, Flash memory, removable memory, other types of storage elements, or combinations of such memory types.

The electronic device 900 may also include a sensor system 910, which may include sensors positioned almost anywhere on the electronic device 900. In some cases, the sensor system 910 may include one or more optical sensor systems, positioned and/or configured as described with reference to any of FIG. 1A-4 or 7. The sensor system 910 may be configured to sense one or more type of parameters, such as but not limited to, vibration; light; touch; force; heat; movement; relative motion; biometric data (e.g., biological parameters) of a user; air quality; proximity; position; connectedness; matter type; and so on. By way of example, the sensor system 910 may include one or more of (or multiple of) a heat sensor, a position sensor, a proximity sensor, a light or optical sensor (e.g., an optical transmitter and/or an optical receiver), an accelerometer, a pressure transducer, a gyroscope, a magnetometer, a health monitoring sensor, and an air quality sensor, and so on. Additionally, the sensor system 910 may utilize any suitable sensing technology, including, but not limited to, interferometric, magnetic, pressure, capacitive, ultrasonic, resistive, optical, acoustic, piezoelectric, or thermal technologies.

The I/O mechanism 912 may transmit or receive data from a user or another electronic device. The I/O mechanism 912 may include the electronic display 902, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 912 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An electronic device, comprising:
 an optical transmitter;
 an optical receiver;
 a memory configured to store,
  an indicator of a next pulse repetition interval (PRI); and a set of parameters associated with operating the optical transmitter in accordance with the next PRI;
an optical transmitter controller configured to,
retrieve the indicator of the next PRI in response to a trigger signal;
retrieve, using the indicator of the next PRI, the set of parameters; and
operate the optical transmitter in accordance with the set of parameters; and
an optical receiver controller configured to,
operate the optical receiver;
update the indicator of the next PRI stored in the memory; and
provide the trigger signal to the optical transmitter controller.

2. The electronic device of claim 1, wherein:
the optical receiver controller is configured to,
monitor an output of the optical transmitter for compliance with a set of predefined performance specifications; and
provide a fault indication to the optical transmitter controller upon identifying a non-compliance with at least one predefined performance specification in the set of predefined performance specifications.

3. The electronic device of claim 1, wherein:
the set of parameters associated with operating the optical transmitter in accordance with the next PRI includes an overcurrent protection (OCP) limit; and
the optical transmitter controller is configured to,
monitor an average operating current of the optical transmitter; and
cease an optical transmission of the optical transmitter upon determining the average operating current exceeds the OCP limit.

4. The electronic device of claim 3, wherein:
the next PRI is a PRI within a set of PRIs; and
different OCP limits are associated with different PRIs in the set of PRIs.

5. The electronic device of claim 1, further comprising:
a lookup table stored in the memory; wherein,
the indicator of the next PRI is stored in the lookup table.

6. The electronic device of claim 1, wherein:
the set of parameters associated with operating the optical transmitter in accordance with the next PRI comprises an overcurrent protection (OCP) limit specific to the next PRI.

7. The electronic device of claim 1, further comprising:
a processor; wherein,
the processor provides the set of parameters associated with operating the optical transmitter in accordance with the next PRI, before the optical receiver controller updates the indicator of the next PRI stored in the memory.

8. The electronic device of claim 1, wherein:
the memory is configured to store different sets of parameters associated with operating the optical transmitter in accordance with respective different PRIs.

9. The electronic device of claim 8, wherein:
the different sets of parameters associated with operating the optical transmitter in accordance with the respective different PRIs include different overcurrent protection (OCP) limits.

10. The electronic device of claim 8, wherein:
the different sets of parameters associated with operating the optical transmitter in accordance with the respective different PRIs include different optical transmit powers.

11. The electronic device of claim 1, wherein:
the optical receiver controller is configured to,
update a set of indicators of next PRIs stored in the memory when updating the indicator of the next PRI stored in the memory; and
sequentially provide to the optical transmitter controller, at different times, trigger signals that cause the optical transmitter controller to retrieve each next PRI indicated by the set of indicators of next PRIs.

12. The electronic device of claim 1, wherein:
the optical receiver controller is configured to,
iteratively update the indicator of the next PRI stored in the memory, with each update being performed while the optical transmitter controller is operating the optical transmitter in accordance with a current PRI.

13. A depth sensor, comprising:
an optical transmitter;
an optical transmitter controller configured to operate the optical transmitter in accordance with a pulse repetition interval (PRI) selected from a set of multiple PRIs having different parameters;
an optical receiver; and
an optical receiver controller configured to operate the optical receiver and provide, to the optical transmitter controller,
a first indication of the PRI; and
a second indication of when to use the PRI;
the first indication and the second indication required by the optical transmitter to operate the optical transmitter in accordance with the PRI and enabling the optical receiver controller to enforce optical transmitter controller compliance with at least one performance specification for the optical transmitter.

14. The depth sensor of claim 13, wherein:
the optical receiver comprises a single-photon avalanche diode.

15. The depth sensor of claim 13, wherein:
the optical receiver comprises a time-of-flight detector.

16. An optical sensor system, comprising:
a set of one or more optical transmitters;
a set of optical receivers distributed between a set of optical sensing banks, each optical sensing bank in the set of optical sensing banks including a respective different subset of optical receivers in the set of optical receivers;
an optical transmitter controller configured to,
enable, at any given time, at least one optical transmitter in the set of one or more optical transmitters, the at least one optical transmitter associated with an optical sensing bank in the set of optical sensing banks; and
operate the enabled at least one optical transmitter in accordance with a next pulse repetition interval (PRI); and
an optical receiver controller configured to,
enable, at any given time, a subset of optical receivers associated with the optical sensing bank; and
provide to the optical transmitter controller, a first set of indications of the next PRI, and a second set of indications of when to use each next PRI.

17. The optical sensor system of claim 16, wherein:
the second set of indications of when to use each next PRI includes,
a first subset of bank enablement signals; and
a second subset of next PRI enablement signals, interspersed with the first subset of bank enablement signals.

18. The optical sensor system of claim 16, further comprising:
   a dot projector including the set of one or more optical transmitters.

19. The optical sensor system of claim 16, further comprising:
   a line projector including the set of one or more optical transmitters.

20. The optical sensor system of claim 16, wherein:
   the optical transmitter controller is configured to,
      retrieve, in response to an indication of the next PRI, an overcurrent protection (OCP) limit associated with the next PRI.

21. The optical sensor system of claim 16, wherein:
   the optical transmitter controller is configured to,
      retrieve, in response to an indication of the next PRI, an optical transmit power associated with the next PRI.

* * * * *